US012679189B2

(12) United States Patent
Gersten et al.

(10) Patent No.: US 12,679,189 B2
(45) Date of Patent: Jul. 14, 2026

(54) DRIVE UNIT FOR A VEHICLE, AND VEHICLE

(71) Applicant: ZF Friedrichshafen AG, Friedrichshafen (DE)

(72) Inventors: Rayk Gersten, Friedrichshafen (DE); Stefan Renner, Bodman-Ludwigshafen (DE); Karlheinz Hoher, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 107 days.

(21) Appl. No.: 18/682,766

(22) PCT Filed: Aug. 2, 2022

(86) PCT No.: PCT/EP2022/071632
§ 371 (c)(1),
(2) Date: Feb. 9, 2024

(87) PCT Pub. No.: WO2023/016854
PCT Pub. Date: Feb. 16, 2023

(65) Prior Publication Data
US 2024/0359547 A1 Oct. 31, 2024

(30) Foreign Application Priority Data
Aug. 10, 2021 (DE) ..................... 10 2021 208 660.8

(51) Int. Cl.
*H02K 3/28* (2006.01)
*B60K 1/02* (2006.01)
(Continued)

(52) U.S. Cl.
CPC ................. *B60K 1/02* (2013.01); *H02K 3/28* (2013.01); *H02K 3/42* (2013.01); *H02K 7/006* (2013.01); *H02K 16/00* (2013.01)

(58) Field of Classification Search
CPC ............ H02K 3/28; H02K 3/42; H02K 7/006; H02K 16/00
(Continued)

(56) References Cited

U.S. PATENT DOCUMENTS 2,860,266 A * 11/1958 Schrader ............... F16K 31/046 310/83
5,677,582 A 10/1997 Lutz et al.
(Continued)

FOREIGN PATENT DOCUMENTS

CN 102148551 A 8/2011
CN 111835117 A 10/2020
(Continued)

OTHER PUBLICATIONS

European Patent Office, International Search report issued in International patent application No. PCT/EP2022/071632 (Nov. 18, 2022).
(Continued)

*Primary Examiner* — Jose A Gonzalez Quinones
(74) *Attorney, Agent, or Firm* — Secant IP, PLLC

(57) ABSTRACT

A drive unit includes two coaxially aligned electric machines. Each electric machine includes a rotor and stator. Each stator has a stator core lamination packet on which stator coils are arranged. The ends of the stators form end-face coil ends. One coil end forms a switching side for connecting electric current and the other coil end forms a counter-switching side. A housing that accommodates the electric machines is provided. The first of the electric machines with its counter-switching side and the second of the electric machines with its counter-switching side are arranged in the shared housing in such manner that the counter-switching sides face toward one another in the axial direction.

14 Claims, 4 Drawing Sheets

(51) Int. Cl.

| | |
|---|---|
| ***H02K 3/42*** | (2006.01) |
| ***H02K 7/00*** | (2006.01) |
| ***H02K 16/00*** | (2006.01) |

(58) Field of Classification Search

USPC .................................. 310/75 R, 98, 112, 114

See application file for complete search history.

(56) References Cited

U.S. PATENT DOCUMENTS

| | | | | |
|---|---|---|---|---|
| 5,838,085 | A | 11/1998 | Roesel, Jr. et al. | |
| 5,936,312 | A | 8/1999 | Koide et al. | |
| 6,022,287 | A * | 2/2000 | Klemen ................. | B60K 6/365 903/952 |
| 7,455,608 | B2 | 11/2008 | Moeller | |
| 9,231,446 | B2 | 1/2016 | Soma et al. | |
| 2006/0022528 | A1 | 2/2006 | Burgman et al. | |
| 2007/0273237 | A1 | 11/2007 | Shichijoh et al. | |
| 2014/0327332 | A1 | 11/2014 | Genda et al. | |
| 2015/0236577 | A1 * | 8/2015 | Yamaguchi .............. | H02K 3/28 310/113 |

FOREIGN PATENT DOCUMENTS

| | | | | | |
|---|---|---|---|---|---|
| DE | 10 2005 001 529 | B3 | 8/2006 | | |
| EP | 0868005 | A2 * | 9/1998 | ............... | B60K 6/26 |
| EP | 3451507 | A1 * | 3/2019 | ............. | H02K 5/132 |

OTHER PUBLICATIONS

European Patent Office, Written Opinion report issued in International patent application No. PCT/EP2022/071632 (Nov. 18, 2022).

German Patent Office, Search Report issued in German patent application No. 10 2021 208 660.8 (Jun. 22, 2022).

* cited by examiner

DRIVE UNIT FOR A VEHICLE, AND VEHICLE

RELATED APPLICATIONS

This application claims the benefit under 35 U.S.C. § 371 as a U.S. National Phase Application of application no. PCT/EP2022/071632, filed on 2 Aug. 2022, which claims the benefit of German Patent Application no. 10 2021 208 660.8 filed on 10 Aug. 2021, the contents of which are hereby incorporated herein by reference in their entireties.

FIELD OF THE DISCLOSURE

The invention relates to a drive unit for a vehicle and to a corresponding vehicle.

SUMMARY

In one embodiment, the drive unit comprises a first electric machine such that the first electric machine comprises a first rotor mounted to rotate about a rotation axis, wherein the rotation axis defines an axial direction, wherein the first rotor extends around the rotation axis in the axial direction, and further comprising a first stator arranged coaxially around the first rotor, wherein the first stator comprises a first stator core lamination packet on which first stator coils are arranged, wherein the first stator coils each form at their respective ends a first end-face coil end and a second end-face coil end, and wherein the first coil end forms a first switching side for the connection of a current and the second coil end forms a first counter-switching side, wherein the drive unit further comprises a second electric machine mounted axially close to the first electric machine, wherein the second electric machine comprises a rotatably mounted second rotor that extends in the axial direction about the rotation axis, and further, a second stator arranged coaxially with it, wherein the second stator comprises a second stator core lamination packet on which second stator coils are arranged, wherein each second stator coil has at its respective ends a third stator coil end and a fourth stator coil end, wherein the fourth coil end forms a second switching side for connecting the current and the third coil end forms a second counter-switching side. In addition, the invention relates to a vehicle.

Particularly in the case of electric or hybrid vehicles, it is known to arrange two electric machines axially close together and coaxially with one another in a drivetrain of a vehicle.

A disadvantage of using two electric machines is that, from a design standpoint, it is difficult to arrange the two electric machines in the drivetrain so that they are close to one another and so that they take up little space in the axial direction in the drivetrain.

DE 10 2005 001 529 B3 discloses a method and an intermediate flange for fastening a first and a second electric machine in a drivetrain of a vehicle, wherein the electric machines each have a rotor and a stator, wherein with the method in a first step the rotor of the first electric machine is fixed to a first clutch of the drivetrain, in a second step the stator of the electric machine is fixed detachably to the rotor of the first electric machine, in a third step an intermediate flange is arranged coaxially with and axially close to the first electric machine, wherein the intermediate flange supports the second electric machine on the side opposite to the first electric machine, the rotor and stator of the second electric machine being fixed to the intermediate flange, and in a fourth step the connection of the stator of the first electric machine to the rotor of the first electric machine is released and the stator of the first electric machine is attached to the intermediate flange.

From DE 4323599 C1 an electric drive input unit for a vehicle drive is known, which comprises two flanged electric machines with their respective housings aligned axially at the ends. The two electric machines are designed as external rotor machines, and in each case the rotor is connected to a rotor support, an interior annular stator is connected to the housing, and the rotor shaft is connected to the rotor support. To reduce the fitting space occupied, the rotor support is in each case arranged on the end at which the two electric machines with their housings are flanged to one another. Consequently, to produce this drive unit two individual electric machines are required, each with its housing, which are flanged to one another. Thus, to produce this drive unit as well two individual, fully complete electric machines, each with its housing and stator support, are needed.

DE 103 14 234 B3 discloses a motor vehicle drivetrain with two electric machines arranged radially relative to one another, of which the radially innermost is an external rotor machine and the one arranged radially outside is an internal rotor machine.

A purpose of the present invention is to provide an improved drive unit with two electric machines, which takes up as little space as possible, and a corresponding vehicle.

The objective is achieved by a drive unit as disclosed herein and to a vehicle incorporating such a drive unit.

Further advantageous features will be apparent from the present disclosure, which can be combined with one another in suitable ways to achieve further advantages.

The objective is achieved by a drive unit for a vehicle, the drive unit comprising a first electric machine, such that the first electric machine comprises a first rotor mounted to rotate about a rotation axis, which rotation axis defines an axial direction, wherein the first rotor extends in the axial direction around the rotation axis, and further comprising a first stator arranged coaxially around the first rotor, wherein the first stator comprises a first stator core lamination packet on which first stator coils are arranged, wherein at each end the first stator coils form, respectively, a first end-face coil end and a second end-face coil end, and wherein the first coil end forms a first switching side for the connection of a current and the second coil end forms a first counter-switching side wherein the drive unit further comprises a second electric machine mounted axially close to the first electric machine, wherein the second electric machine comprises a rotatable mounted second rotor which extends in the axial direction around the rotation axis, and further, a second stator arranged coaxially with the second rotor, wherein the second stator comprises a second stator core lamination packet on which second stator coils are arranged, wherein the second stator coils have at their respective ends a third stator coil end and a fourth stator coil end, wherein the fourth coil end forms a second switching side for connecting the current and the third coil end forms a second counter-switching side, wherein a housing which accommodates the first and also the second machine is provided, wherein the first electric machine with the first counter-switching side and the second electric machine with the second counter-switching side are arranged in the shared housing in such manner that the first counter-switching side and the second counter-switching side face toward one another in the axial direction.

The rotation axis defines an axial direction. A radial direction then extends perpendicularly to the rotation axis.

'Axially close to' can be understood to mean parallel to.

The stator coils can also be called windings, and their coil ends can be called winding heads.

It is known that the space occupied by electric machines in a drivetrain is largely restricted by the surrounding axle structure. Thus, according to the invention the first electric machine with its first stator and the second electric machine with its second stator are arranged in a shared housing in such manner that the first counter-switching side and the second counter-switching side are axially opposite one another.

This results in a particularly space-saving arrangement accommodated in a single housing.

In this context, the switching side describes that part of the winding end at which switching connections for the supply of electric current to the winding end are arranged.

In this case the stators are arranged with their counter-switching sides opposite one another in such manner that there is an air insulation gap between them (the distance through the air with the shortest air gap between the two electrical stators or coil ends without any spark-over taking place). In that way, mutual damage of the stators during operation can be prevented. The air insulation gap depends, for example, on the size of the winding heads or coil ends.

In a further design, a partition wall extending in the radial direction is provided at least between the second coil end of the first counter-switching side and the third coil end of the second counter-switching side. The radial direction (radial orientation) is perpendicular to the rotation axis. In this case, the partition wall can be joined to the housing, for example flanged/brazed on or welded on, or it can be made integrally with the housing, i.e., for example made as one piece.

In that way the machines can be spatially separated.

In this case the partition wall is arranged so that there is a sufficient air insulation gap between the respective coil ends of the counter-switching side and the partition wall.

In one design, the first and the second stator coils are made as shaped bar windings. In that case the conductor of the winding has a polygonal, in particular a rectangular cross-section. In that way a particularly dense winding can be produced. Particularly with a shaped bar winding, however, stator coils of unequal axial width can be produced; in other words, areas in the winding heads are produced which are locally not rotationally symmetrical. Especially on the counter-switching side, for example, there can be areas where the typical structure with stator coils of equal width cannot be produced. There, stator coils of unequal axial width can be used in order, on the connection side, to be able to switch the coil ends appropriately. The areas with stator coils of unequal width, also called concentric stator coils, project farther out from the winding head than the stator coils of equal width. This means that the stators at the respective coil ends of the counter-switching sides, i.e., at each winding head of the counter-switching sides, have an area which is locally not rotationally symmetrical, but which has an axial projection.

In a further design, at the first coil end of the first switching side a first coil connection area is provided, for interconnecting the first stator coils by means of a first connecting device. Such a connecting device can comprise a power connection area for supplying electric current to the electric machine. Besides the power connection area, the connecting device is connected by way of the power connection area to a power electronics unit and a control electronics unit, which for the operation of the electric machine can feed the stator coils with a current of variable phase and amplitude.

In a further embodiment the second coil end of the first counter-switching side has a first axial projection facing axially away from the first stator, in particular positioned essentially opposite the first coil connection area. In addition, in a further design the partition wall has a perforation in the area of the first projection, in the form of a radial and axial cut-out. In that way, in the area with stator coils of unequal axial width the necessary insulation gap can be maintained so that nevertheless only little fitting space is needed.

In a further design, on the fourth coil end of the second switching side a second coil connection area is provided for interconnecting the second stator coils by means of a second connecting device. In addition, in a further design the third coil end of the second counter-switching side has a second axial projection facing axially away from the second stator. The second axial projection too can be positioned essentially opposite the second coil connection area.

Furthermore, in another design, in the area of the second projection the partition wall has a perforation, for example in the form of a cut-out. In that way, in the area with stator coils of unequal axial width the necessary insulation gap can be maintained so that only little fitting space is nevertheless needed.

Thus, by virtue of the perforations in the partition wall the two electric machines can be accommodated while maintaining the insulation gap required and at the same time taking up little fitting space. Thanks to the housing wall with perforations the axial space required for the air insulation gaps can be reduced.

In a further design, the second coil end of the first counter-switching side comprises a first axial projection facing away from the first stator and the third coil end of the second counter-switching side comprises a second axial projection facing away from the second stator, the first stator being arranged in a rotated position relative to the second stator, so that the first axial projection and the second axial projection are not opposite one another.

Due to this relative rotation of the stators, for example in the partition of the stator fixing, only as little axial-fitting space as possible is occupied and only as large an air insulation gap as necessary is produced. This makes possible a particularly space-saving arrangement of the two machines in a housing, for example without making the air insulation gap smaller than necessary.

In addition, the stated objective is achieved by a vehicle with a drive unit as described above, in which the first electric machine and the second electric machine are installed transversely to the travel direction and the vehicle is an electric vehicle or a hybrid vehicle.

BRIEF DESCRIPTION OF THE DRAWINGS

Further properties and advantages of the present invention emerge from the description given below, with reference to the attached figures which show, schematically in each case.

DETAILED DESCRIPTION

Figure 1:
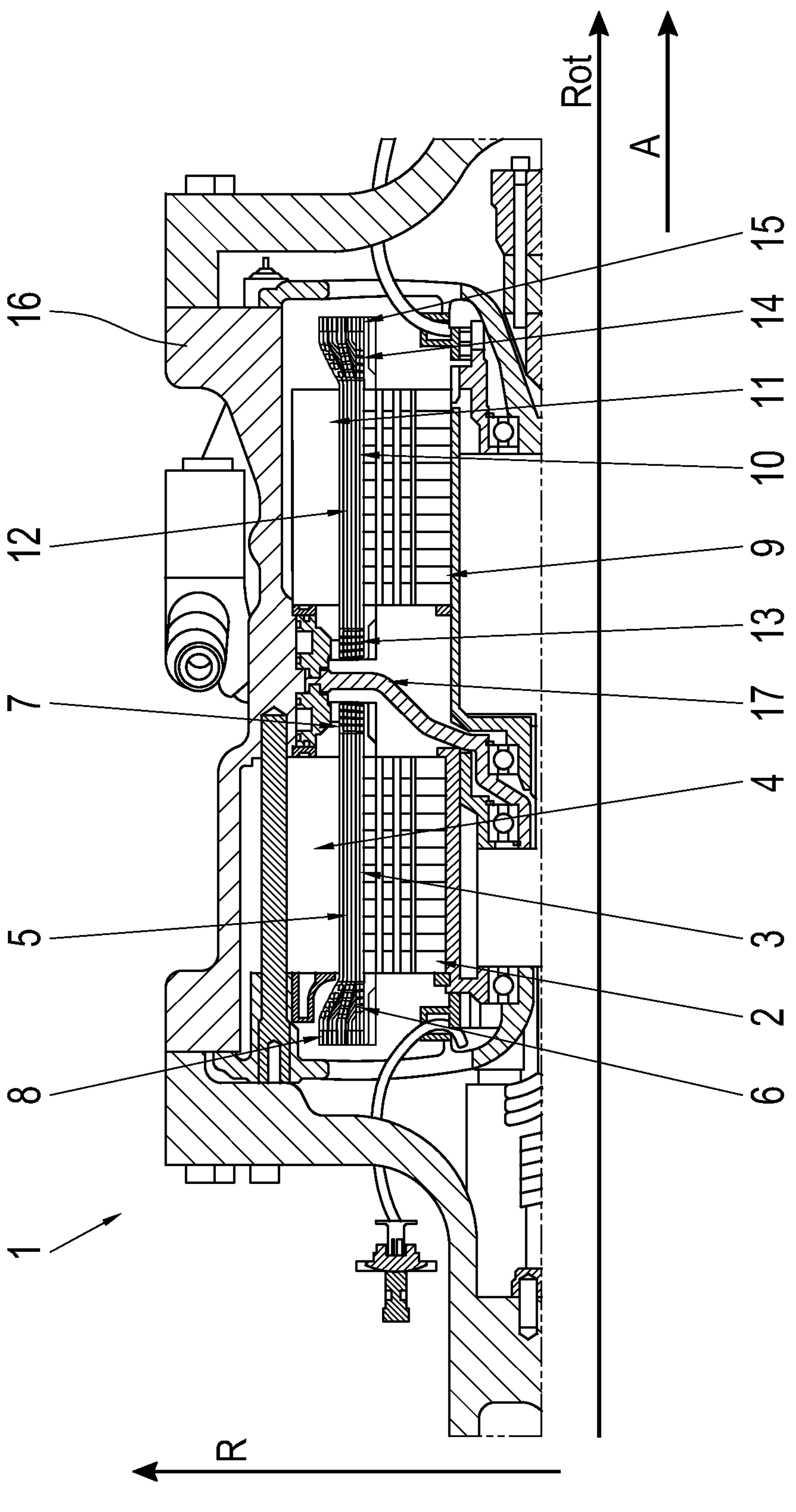
FIG. 1: A drive unit according to the invention.

FIG. 1 shows a drive unit 1. This comprises a first electric machine and a second electric machine. The second electric machine is axially close to, i.e., parallel to the first electric machine.

The first electric machine comprises a first rotor 2 and a first stator 3. In this case the first rotor 2 is mounted to rotate about a rotation axis Rot. The rotation axis Rot defines an axial direction A. A radial direction R is perpendicular to the rotation axis Rot.

Furthermore, the first stator 3 comprises a stator core lamination packet 4 and a stator yoke with stator teeth and first stator coils 5, namely, the so-termed stator windings. The first stator coils 5 usually consist of copper or some other conductive material.

At the ends (end faces) the first stator coils 5 form in each case winding heads, which are denoted as a first coil end 6 and a second coil end 7.

Moreover, at the first coil end 6 a first coil connection area is provided, whereby the first coil end 6 is a switching side for interconnecting the first stator coils 5 by means of a first connecting device 8. Such a first connecting device 8 comprises a first power connection area for supplying electric current to the electric machine. The first connecting device 8 is also connected via a power connection area with a first power electronics unit and a control electronics unit with a source of electrical energy which, for operating the electric machine, can supply the first stator coils 5 with current of variable phase and amplitude.

The second coil end 7 axially opposite is called the counter-switching side.

The second electric machine comprises a second rotor 9 and a second stator 10. The second rotor 9 is mounted to rotate about the rotation axis Rot. Moreover, the second stator 10 comprises a second stator core lamination packet 11 and a stator yoke with stator teeth and second stator coils 12. The second stator coils 12 usually consist of copper or some other conductive material.

At the ends (end faces) the second stator coils 12 form in each case winding heads, which are denoted as the third coil end 13 and the fourth coil end 14.

Furthermore, on the fourth coil end 14 a second coil connection area is provided, whereby the fourth coil end 14 is in the form of a switching side for interconnecting the second stator cols 12 by means of a second connecting device 15. Such a second connecting device 15 comprises a power connection area for supplying the electric machine with electric current. The coil end 13 axially opposite the switching side is called the counter-switching side.

The two electric machines are accommodated in a shared housing 16. In the vehicle the two electric machines are installed transversely to a travel direction. In particular, the vehicle is an electric vehicle or a hybrid vehicle.

Between the two electric machines a partition wall 17 is arranged. This can be attached to the housing 16, for example welded or flanged on, or it can be made integrally therewith. The partition wall 17 is positioned in the radial direction R, in the area of the stators 3, 10, axially in the middle between the first stator 3 and the second stator 10.

By virtue of this arrangement the axial-fitting space is limited or restricted by the surrounding axle configuration.

Thus, the first stator 3 and the second stator 10 are arranged with their respective counter-switching sides facing toward one another in the housing 16. This means that the first coil end 6, which functions as a switching side, and the fourth coil end 14, which also functions as a switching side, are arranged facing outward toward the housing 16. The second coil end 7 and the third coil end 13 are arranged axially opposite or facing toward one another.

In this case the partition wall 17 is in the area of the coil ends 7, 13, axially in the middle.

This results in a particularly small fitting space.

The respective coil ends 7, 13 each are in particular an equal air insulation gap away from the partition wall 17. In that way damage, for example due to sparking across, can be prevented.

In particular, the stator winding is in the form of a shaped bar winding. The conductors of the winding have a polygonal, in particular a rectangular cross-section. In that way a particularly dense winding can be produced. However, particularly in a shaped bar winding coils with unequal axial width form at the second coil end 7 and the third coil end 13. In other words, areas form which are locally not rotationally symmetrical.

Especially on the counter-switching side there are areas where the typical structure with stator coils 5, 12 of equal axial width cannot be produced. There, stator coils 5, 12 with unequal axial width are used in order to be able, on the switching side, to connect the coil ends 6, 14 appropriately with respective interconnection devices 8, 15.

Figure 2:
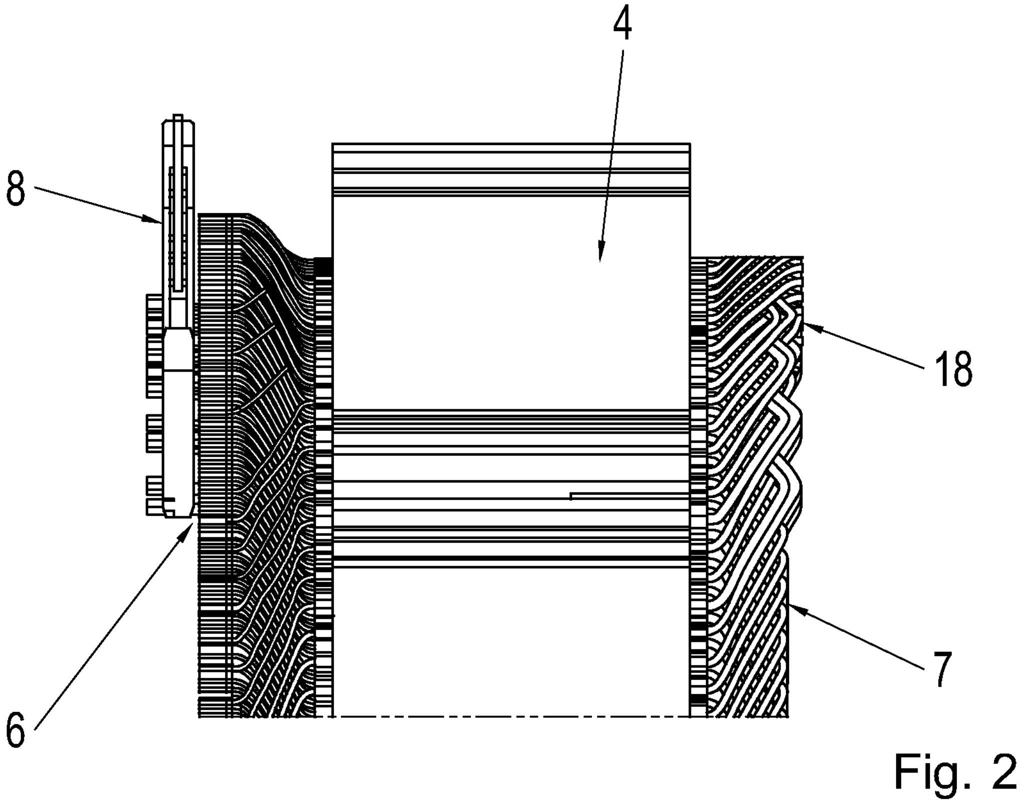
FIG. 2: Stator coils, in detail.
Figure 3:
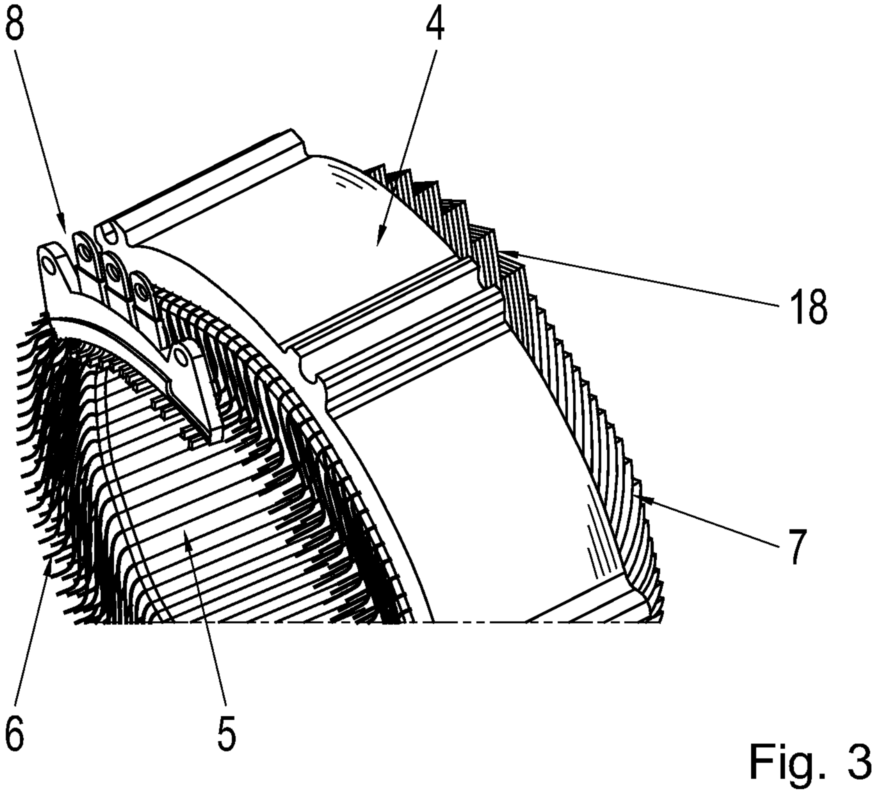
FIG. 3: An interconnection device at a coil end.

FIG. 2 shows such stator coils 5, 12. The areas with stator coils 5, 12 of unequal width, also called concentric stator coils, project axially farther out of the coil ends 7, 13 (winding head) than stator coils of equal axial width. This means that the stators 3, 10 at the respective coil ends 7, 13 of the counter-switching side, i.e., at the respective winding head of the counter-switching side of the stator 3, 10, have an area which is not rotationally symmetrical, but have an axial projection 18, 19. In this context a projection 18, 19 is understood to be a coil area that protrudes axially. The first stator 3 has a first axial projection 18 and the second stator 10 (FIG. 6) has a second axial projection 19 (FIG. 6), FIG. 3 shows the first interconnecting device 8 of the first coil end 6 in detail. Such a first interconnecting device 8 comprises a power connection area for supplying electric current to the electric machine. The first interconnecting device 8 is connected to a control unit which, in turn, comprises a control electronics unit and a power electronics unit for the requisite control of the coil currents. In particular, each electric machine can be connected to a respectively separate power electronics unit.

Figure 6:
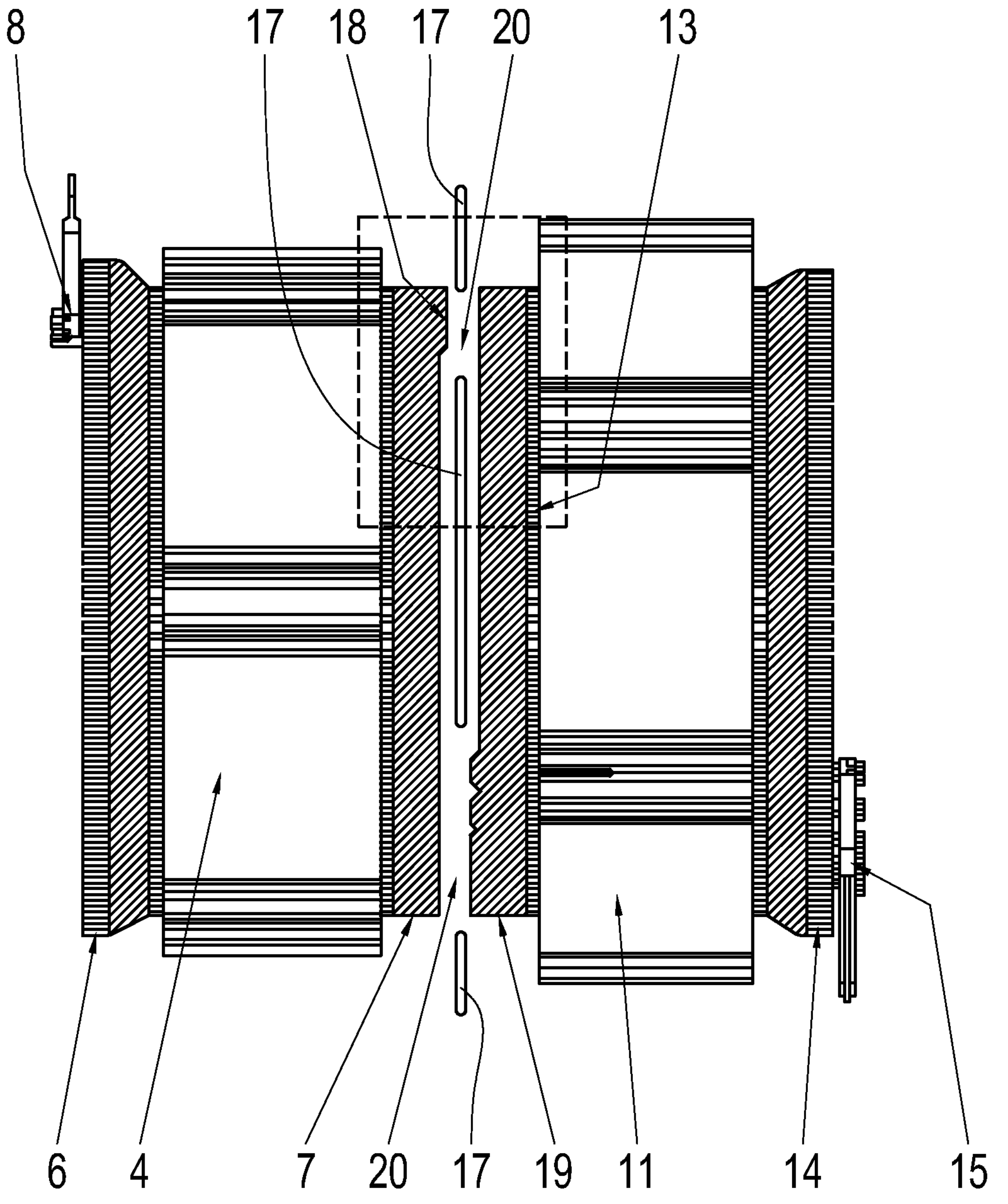
FIG. 6: A relatively rotated stator arrangement.

Furthermore, there are perforations 20 in the partition wall 17 in the area of the first axial projection 18 (FIG. 4) and the second axial projection 19 (FIG. 6).

Figure 4:
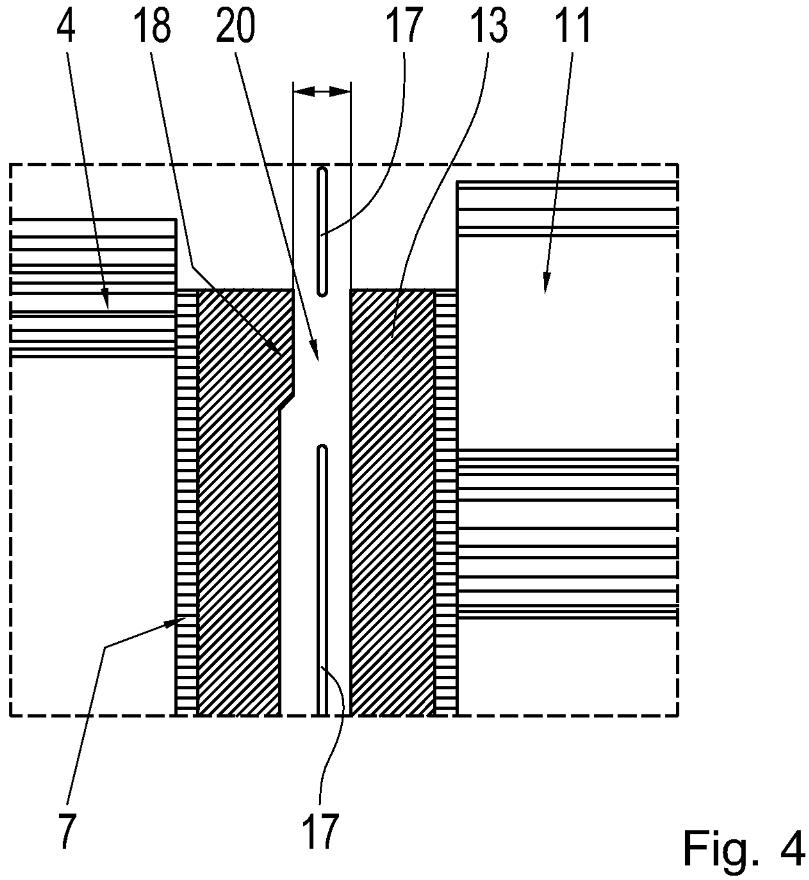
FIG. 4: A partition wall with a perforation.

FIG. 4 shows a perforation 20 in the partition wall 17, in the area of the first axial projection 18. This can reduce the axial space required fir air insulation gaps, so that the axial space as a whole is kept small. The arrangement here is chosen such that the air insulation gap from the second coil end 7 or the first projection 18 to the third coil end 13 is minimal but, for example, no risk due to spark-over or other risks to the two current-carrying stators 3, 10 can occur, i.e., the high-voltage resilience is ensured. In that way the necessary insulation distance can be maintained.

Figure 5:
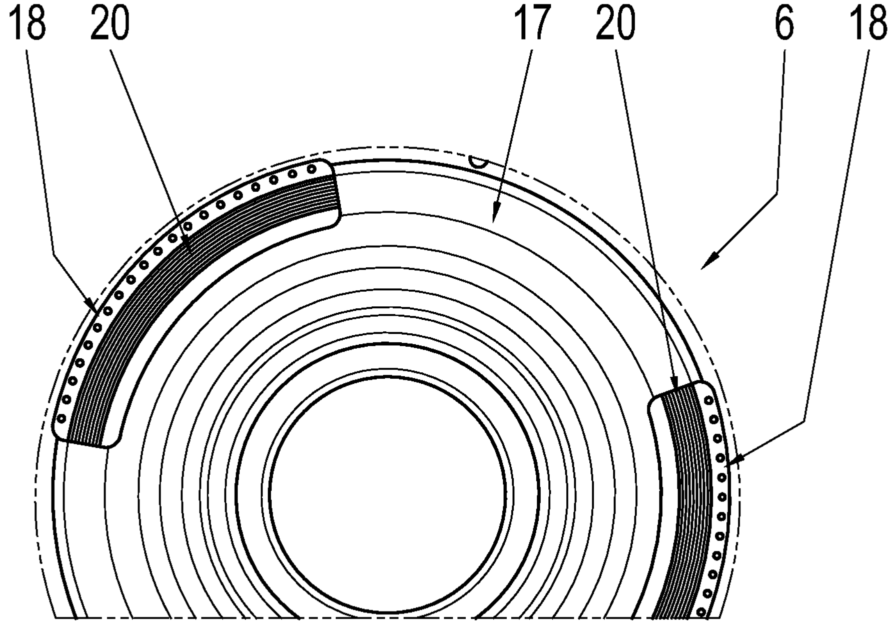
FIG. 5: A side view of a stator with several perforations.

FIG. 5 shows a side view with several perforations 20. The perforations can be in the form of a radial and axial cut-out in the partition wain 7. In that way, in the area of stator coils with unequal axial width the insulation gaps required can be maintained, so that despite this only a small axial filling space is needed.

Furthermore, the first stator 3 and the second stator 10 can be arranged rotated relative to one another, so that the first axial projection 18 and the second axial projection 19 are not axially directly opposite one another.

FIG. 6 shows a relatively rotated stator arrangement of that kind. The first axial projection 18 and the second axial projection 19 are not axially opposite one another in this case. At the projections 18, 19 there are perforations 20 in the partition wall 17, in order to maintain the air insulation gap. Due to the relative rotation of the stators 3, 10 and the relative rotation of the projections 18, 19, the air insulation gap between the individual projections and the respective other stator 3, 10 or the coil ends 7, 13 can be kept as small as possible. This means that the air insulation gap between the first projection 18 and the third coil end 13, and the air insulation gap between the second projection 19 and the second coil end 7, are kept as small as possible. In that way, as with the perforations 20, the insulation gaps are maintained while as little axial fitting space as possible is needed.

By virtue of this relative rotation of the stators in the partition of the stator fixing, only as little axial fitting space as possible is used and only as large air insulation gaps as necessary are produced. This makes possible a particularly space-saving arrangement of the two machines in the housing 16 without, for example, making the air insulation gaps smaller than they should be.

INDEXES

1 Drive unit
2 First rotor
3 Second rotor
4 Stator core lamination packet
5 First stator coil
6 First coil end
7 Second coil end
8 First interconnection device
9 Second rotor
10 Second stator
11 Second stator core lamination packet
12 Second stator coil
13 Third coil end
14 Fourth coil end
15 Second interconnection device
16 Housing
17 Partition wall
18 First axial projection
19 Second axial projection
20 Perforations
Rot Rotation axis
A Axial direction
Radial direction

The invention claimed is:

1. A drive unit for a vehicle, comprising:

a first electric machine-comprising a first rotor mounted to rotate about a rotation axis, the rotation axis defining an axial direction, wherein the first rotor extends in the axial direction around the rotation axis, and the first electric machine further comprises a first stator arranged coaxially with the first rotor, wherein the first stator a stator core lamination packet on which first stator coils are arranged, wherein the first stator coils have a first coil end and a second coil end which form a first end face and a second end face, respectively, and wherein the first coil end forms a first switching side for connecting a current and the second coil end forms a first counter-switching side;

a second electric machine mounted axially close to the first electric machine, wherein the second electric machine comprises a second rotor mounted to rotate, the second rotor extends in the axial direction around the rotation axis and comprises a second stator arranged coaxially therewith, the second stator comprising a second stator core lamination packet on which second stator coils are arranged, wherein the second stator coils have a third coil end and a fourth coil end which from a third end face and a fourth end face, respectively, wherein the fourth coil end forms a second switching side for connecting a current and the third coil end forms a second counter-switching side, wherein the second coil end has a projection that extends from the second end face axially away from the first stator, and the third coil end has a projection that extends from the third end face axially away from the second stator, wherein the projection of the second coil end is rotationally offset from the projection of the third coil end; and a housing configured to accommodate the first electric machine and the second electric machine, wherein the first electric machine and the second electric machine are arranged within the housing such that the first counter-switching side and the second counter-switching side face toward one another in the axial direction.

2. The drive unit according to claim 1, wherein the first stator and the second stator are arranged relative to one another such that the second end face is separated from the third end face by an air insulation gap.

3. The drive unit according to claim 1, comprising:

a partition wall having at least one perforation extends in the radial direction at least between the second coil end of the first stator coils and the third coil end of the second stator coils.

4. The drive unit according to claim 3, wherein the partition wall is connected to the housing or made integrally with the housing.

5. The drive unit according to claim 1, wherein a first coil connection area is provided at the first coil end on the first switching side for interconnecting the first stator coils by a first interconnecting device.

6. The drive unit according to claim 5, wherein the projection of the second coil end extends toward the third coil end such that the projection of the second coil end is closer to the third coil end than the second end face.

7. The drive unit according to claim 6, wherein the projection of the second coil end is arranged opposite to the first coil connection area.

8. A drive unit for a vehicle, comprising:

a first electric machine comprising a first rotor mounted to rotate about a rotation axis, the rotation axis defining an axial direction, wherein the first rotor extends in the axial direction around the rotation axis, and the first electric machine further comprises a first stator arranged coaxially with the first rotor, wherein the first stator comprises a stator core lamination packet onto which first stator coils are arranged, wherein ends of the first stator coils form a first an end-face coil end and a second end-face coil end, and wherein the first end-face coil ends form a switching side for connecting a current and the second coil ends form a first counter-switching side;

a second electric machine mounted axially close to the first electric machine, wherein the second electric machine comprises a second rotor mounted to rotate, the rotor extending in the axial direction around the rotation axis, and in addition comprises a second stator arranged coaxially therewith, the second stator comprising a second stator core lamination packet on which second stator coils are arranged, wherein ends of the second stator coils form a third end-face coil end and a fourth end-face coil end, wherein the fourth coil end forms a second switching side for connecting a current and the third coil end forms a second counter-switching side; and a housing configured to accommodate the first electric machine and the second electric machine, wherein the first electric machine is arranged with the first counter-switching side and the second electric machine is arranged with the second counter-switching side in the housing in such manner that the first counter-switching side and the second counter-switching side face toward one another in the axial direction;

wherein a first coil connection area is provided at the first coil ends on the first switching side for interconnecting the first stator coils by means of a first interconnecting device;

the second coil end of the first counter-switching side has an axial projection facing away from the first stator; and wherein a partition wall extends in a radial direction between the second coil end and the third coil end and the partition wall has a perforation in an area of a first axial projection that extends from the second coil end away from the first stator.

9. The drive unit according to claim 1, wherein at the fourth coil ends of the second switching side, a second coil connection area is provided for interconnecting the second stator coils by means of a second interconnecting device.

10. The drive unit according to claim 1, wherein the projection of the third coil end extends toward the second coil end such that the projection of the third coil end is closer to the second coil end than the third coil end face.

11. The drive unit according to claim 9, wherein the projection of the third coil end is arranged opposite to the second coil connection area.

12. A drive unit for a vehicle, comprising:

a first electric machine comprising a first rotor mounted to rotate about a rotation axis, the rotation axis defining an axial direction, wherein the first rotor extends in the axial direction around the rotation axis, and the first electric machine further comprises a first stator arranged coaxially with the first rotor, wherein the first stator comprises a stator core lamination packet onto which first stator coils are arranged, wherein ends of the first stator coils form a first an end-face coil end and a second end-face coil end, and wherein the first end-face coil ends form a switching side for connecting a current and the second coil ends form a first counter-switching side;

a second electric machine mounted axially close to the first electric machine, wherein the second electric machine comprises a second rotor mounted to rotate, the rotor extending in the axial direction around the rotation axis, and in addition comprises a second stator arranged coaxially therewith, the second stator comprising a second stator core lamination packet on which second stator coils are arranged, wherein ends of the second stator coils form a third end-face coil end and a fourth end-face coil end, wherein the fourth coil end forms a second switching side for connecting a current and the third coil end forms a second counter-switching side; and a housing configured to accommodate the first electric machine and the second electric machine, wherein the first electric machine is arranged with the first counter-switching side and the second electric machine is arranged with the second counter-switching side in the housing in such manner that the first counter-switching side and the second counter-switching side face toward one another in the axial direction;

wherein the third coil end of the second counter-switching side has a second axial projection facing away from the second stator;

the second axial projection is arranged opposite to the second coil connection area; and wherein a partition wall extends in a radial direction between the second coil end and the third coil end and the partition wall has a perforation in an area of second axial projection that extends from the third coil end away from the second stator.

13. The drive unit according to claim 1, wherein a partition wall is connected to the housing and extends radially between the first and the second stators, the first stator is rotated relative to the second stator such that the projection of the second coil end and the projection of the third coil end extend toward respective perforations in the partition wall that are radially opposite one another.

14. A vehicle with a drive unit according to claim 1, wherein the first electric machine and the second electric machine are installed transversely to a travel direction of the vehicle and the vehicle is an electric vehicle or a hybrid vehicle.

* * * * *